United States Patent
Nishino et al.

(10) Patent No.: US 11,215,878 B2
(45) Date of Patent: Jan. 4, 2022

(54) LIQUID CRYSTAL DISPLAY DEVICE

(71) Applicant: Japan Display Inc., Tokyo (JP)

(72) Inventors: Tomonori Nishino, Tokyo (JP); Masato Shimura, Tokyo (JP); Tomokazu Ishikawa, Tokyo (JP); Yuki Kuramoto, Tokyo (JP); Satoshi Hashimoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/929,610

(22) Filed: Jul. 15, 2020

(65) Prior Publication Data

US 2020/0348548 A1 Nov. 5, 2020

Related U.S. Application Data

(63) Continuation of application No. 16/662,128, filed on Oct. 24, 2019, now Pat. No. 10,761,381, which is a continuation of application No. 16/286,767, filed on Feb. 27, 2019, now Pat. No. 10,495,929, which is a continuation of application No. 16/114,350, filed on Aug. 28, 2018, now Pat. No. 10,261,366, which is a continuation of application No. 15/844,825, filed on Dec. 18, 2017, now Pat. No. 10,088,713, which is a continuation of application No. 15/606,531, filed on May 26, 2017, now Pat. No. 9,874,785, which is a continuation of application No. 14/817,520, filed on Aug. 4, 2015, now Pat. No. 9,696,592.

(30) Foreign Application Priority Data

Aug. 6, 2014 (JP) .................... 2014-160415

(51) Int. Cl.
*G02F 1/1339* (2006.01)
*G02F 1/1368* (2006.01)
*G02F 1/1333* (2006.01)

(52) U.S. Cl.
CPC .......... *G02F 1/1339* (2013.01); *G02F 1/1368* (2013.01); *G02F 1/13396* (2021.01); *G02F 1/133311* (2021.01); *G02F 1/133345* (2013.01)

(58) Field of Classification Search
None
See application file for complete search history.

(56) References Cited

U.S. PATENT DOCUMENTS 10,495,929 B2 * 12/2019 Nishino ................ G02F 1/1339
10,761,381 B2 *  9/2020 Nishino ................ G02F 1/1368

* cited by examiner

*Primary Examiner* — Phu Vu
(74) *Attorney, Agent, or Firm* — Michael Best & Friedrich LLP

(57) ABSTRACT

In order to avoid generation of black unevenness caused by the water intrusion into a liquid crystal display device, there is to provide a liquid crystal display device including a display area and a terminal portion, in which a TFT substrate with an organic passivation film formed and an opposite substrate are adhered to each other by a seal portion and a liquid crystal is enclosed there, wherein in the seal portion of the TFT substrate, a groove-shaped through-hole is formed in the organic passivation film to surround the display area, a water absorption layer formed of the same material in the same process as that of the organic passivation film is formed within the groove-shaped through-hole, and the water absorption layer is not covered with the inorganic insulating film.

11 Claims, 9 Drawing Sheets

LIQUID CRYSTAL DISPLAY DEVICE

CROSS-REFERENCE TO RELATED APPLICATIONS

This application is a continuation of U.S. patent application Ser. No. 16/662,128, filed on Oct. 24, 2019, which, in turn, is a continuation of U.S. patent application Ser. No. 16/286,767, filed on Feb. 27, 2019 (now U.S. Pat. No. 10,495,929), which, in turn, is a continuation of U.S. patent application Ser. No. 16/114,350 (now U.S. Pat. No. 10,261,366), filed on Aug. 28, 2018, which, in turn, is a continuation of U.S. patent application Ser. No. 15/844,825 (now U.S. Pat. No. 10,088,713), filed on Dec. 18, 2017, which, in turn, is a continuation of U.S. patent application Ser. No. 15/606,531 (now U.S. Pat. No. 9,874,785), filed on May 26, 2017, which, in turn, is a continuation of U.S. patent application Ser. No. 14/817,520 (now U.S. Pat. No. 9,696,592), filed on Aug. 4, 2015. Further, this application claims priority from Japanese Patent Application No. 2014-160415 filed on Aug. 6, 2014, the entire contents of which are hereby incorporated by reference into this application.

BACKGROUND OF THE INVENTION

(1) Field of the Invention

The invention relates to a display device and particularly, to a liquid crystal display device capable of avoiding black unevenness generated in a display area.

(2) Description of the Related Art

A liquid crystal display device is formed by a TFT substrate with pixels including pixel electrodes and thin film transistors (TFT) formed in a matrix shape, an opposite substrate facing the TFT substrate, and a liquid crystal interposed between the TFT substrate and the opposite substrate. Then, an image is formed by controlling the transmittance of light through liquid crystal molecules in every pixel.

In a liquid crystal display device, there sometimes occurs black unevenness especially in the periphery of a display area. This may be affected by the water entering into the liquid crystal. In order to avoid the water from entering inside, various structures have been developed. On the other hand, there is another way of, even if water enters into the liquid crystal display device, adsorbing the water entered inside in order to suppress the affect on the liquid crystal.

Japanese Patent Publication Laid-Open No. 2008-191265 discloses a structure in which an adsorbent layer for adsorbing the water is arranged in a seal portion for sealing the TFT substrate and the opposite substrate. Japanese Patent Publication Laid-Open No. 2012-150290 discloses a structure in which an adsorbent layer for adsorbing the water is arranged between a display area and a seal portion.

SUMMARY OF THE INVENTION

The both structures described in Japanese Patent Publication Laid-Open No. 2008-191265 and Japanese Patent Publication Laid-Open No. 2012-150290 are to arrange an adsorption layer for adsorbing the water entered inside a liquid crystal display device; then, as the adsorption layer, a material which is not used usually for the liquid crystal display device is used. In other words, something other than the essential material for the operation of the liquid crystal display device is used as another component. This conventional method has the following problems:

(1) The other component is arranged in the different process; therefore, the manufacturing cost is increased according to an increase in the component cost and the process. (2) The material other than the essential material for the operation of the liquid crystal display device is used; therefore, it is necessary to check whether the display performance is affected by the material when the liquid crystal display device is operated for a long time.

An object of the invention is to solve the above problems and to avoid black unevenness from occurring in a liquid crystal display device by effectively adsorbing water entered into a liquid crystal display panel, without increasing the manufacturing cost and without deteriorating reliability.

The invention is to solve the above problems and the concrete means are as follows.

(1) A liquid crystal display device including a display area and a terminal portion, in which a TFT substrate with an organic passivation film formed there and an opposite substrate are adhered to each other by a seal portion and a liquid crystal is enclosed there, wherein in the seal portion of the TFT substrate, a groove-shaped through-hole is formed in the organic passivation film to surround the display area, a water absorption layer formed of the same material in the same process as that of the organic passivation film is formed within the groove-shaped through-hole, and the water absorption layer is not covered with the inorganic insulating film.

(2) The device according to the above (1), wherein the water absorption layer is continuously formed along the whole periphery to surround the display area.

(3) The device according to the above (1), wherein the water absorption layer is formed discontinuously to surround the display area.

(4) The device according to the above (1), wherein the water absorption layer is formed only in the corner portions of the display area.

DETAILED DESCRIPTION OF THE PREFERRED EMBODIMENTS

Figure 9:
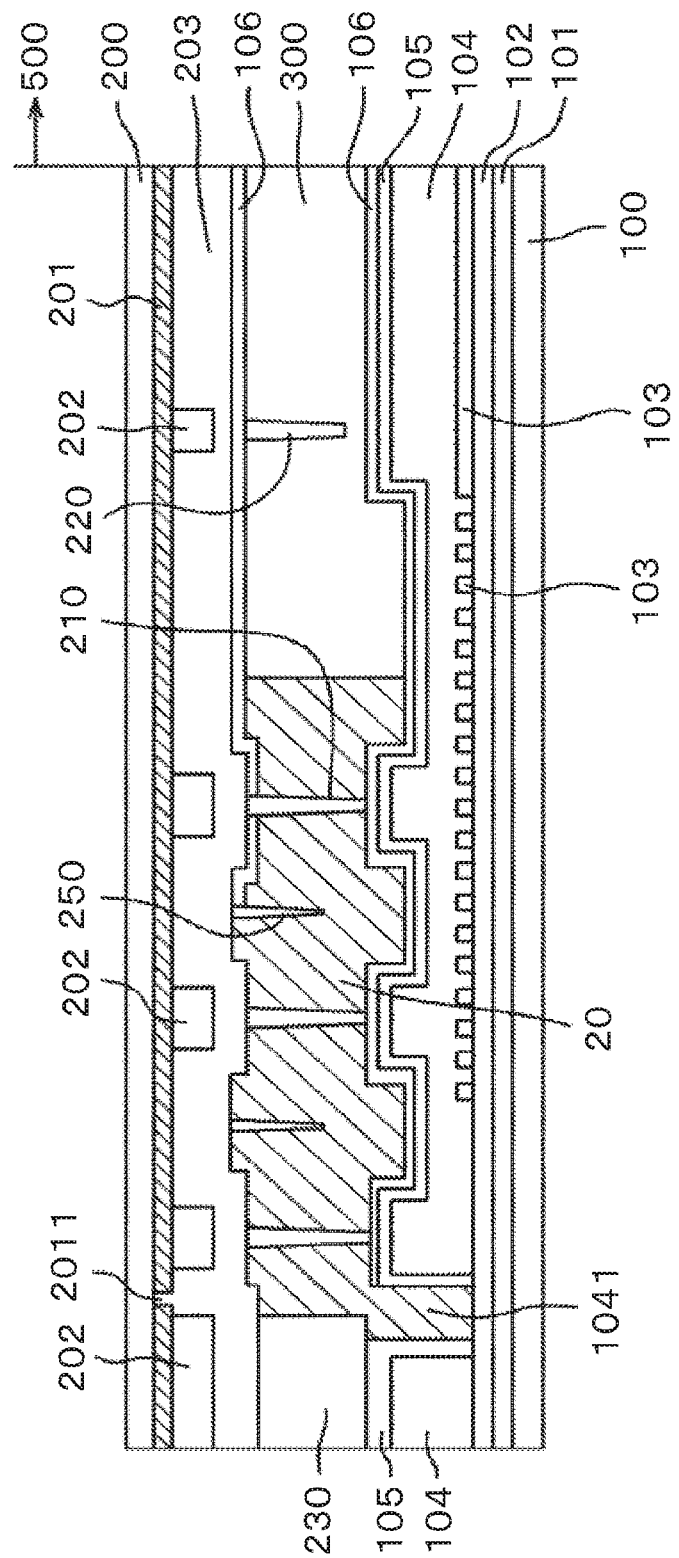
FIG. 9 is a cross-sectional view illustrating the structure of the seal portion of the liquid crystal display device used together with the invention.

Before describing the embodiment of the invention, a structure for avoiding water from entering into a liquid crystal layer, which is used together with the invention, will be described. FIG. 9 is a cross-sectional view in the vicinity of a seal portion of a liquid crystal display device. In FIG. 9, a TFT substrate 100 and an opposite substrate 200 are adhered to each other by a sealing material 20. An organic passivation film 4 serving also as a flattening film is formed on the TFT substrate 100. This organic passivation film 104 is formed of acrylate resin; therefore, the above film absorbs water and transmits the water easily. Further, the organic passivation film 104 also serves as the flattening film and formed thick with 1 to 4 μMm generally with 2 to 3 μm; therefore, the above film easily transmits the water.

The organic passivation film is provided with a groove-shaped through-hole along the end portion of the TFT substrate 100 in a way of surrounding a display area. The water absorbed by the organic passivation film 104, coming from the end portion of the substrate inwardly, is shut out by the groove-shaped through-hole 1041 and does not arrive at a liquid crystal layer 300. In the groove-shaped through-hole 1041, the organic passivation film 104 is covered with the insulating film 105 formed of SiN; therefore, it takes a long time for the entered water to pass the groove-shaped through-hole 1041, hence to prolong a lifetime of the liquid crystal display device as much.

In the structure as illustrated in FIG. 9, however, once the water passes the insulating film 105, the water easily arrives at the liquid crystal layer 300. According to the structure as illustrated in FIG. 9, there is a limit to a long life of the liquid crystal display device.

In the opposite substrate 200 in FIG. 9, a black matrix 201 is formed extensively in the end portion of the substrate. The black matrix 201 is formed of an organic material in many cases. When the black matrix is formed of the organic material, water easily enters from the end portion. In order to shut down the water entered through the black matrix 201, a black matrix groove 2011 is formed. The black matrix is not so thick as the organic passivation film 104 in the TFT substrate 100 and therefore, the entered amount of the water is smaller than that on the side of the TFT substrate. The contents of the invention will be described in detail using the following embodiments.

First Embodiment

Figure 1:
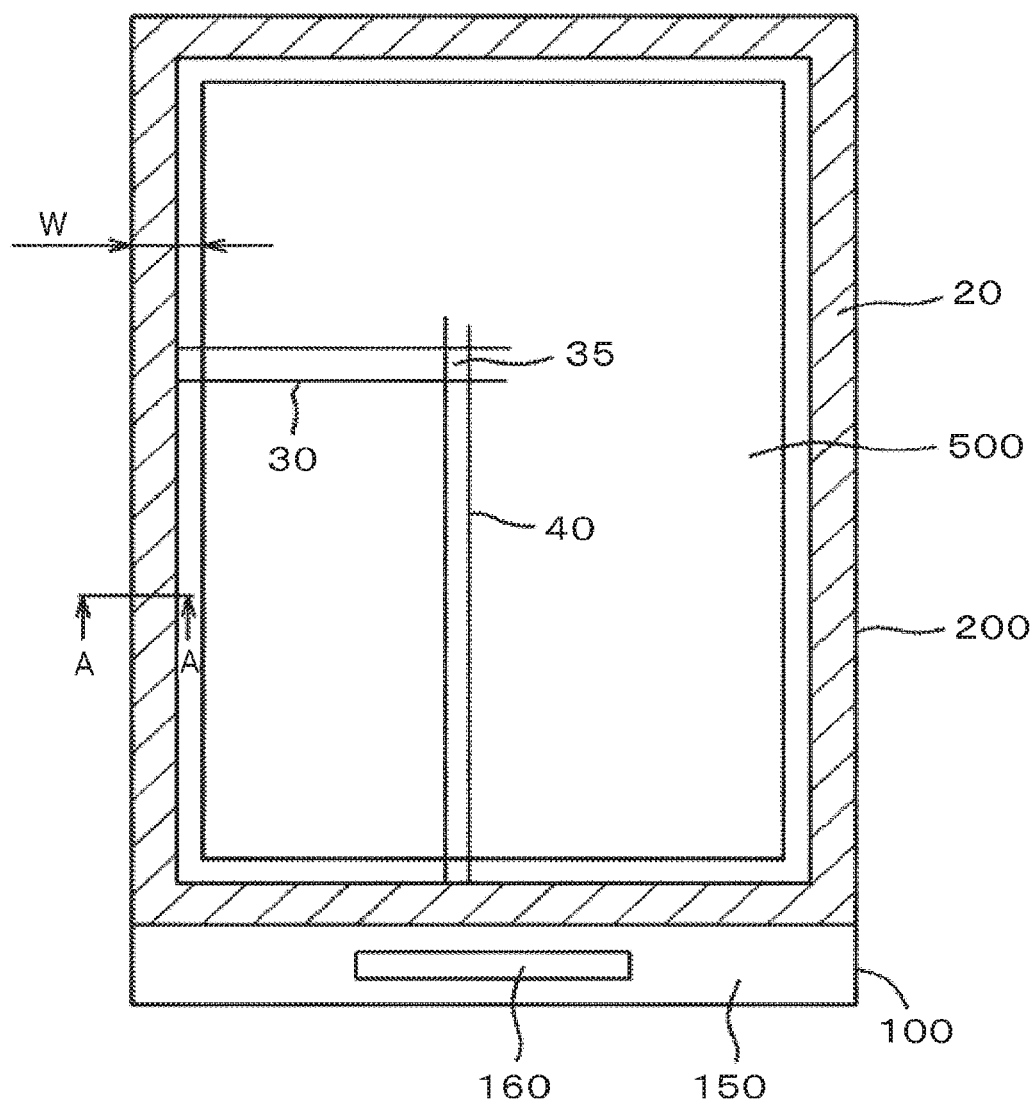
FIG. 1 is a top plan view of a liquid crystal display device according to the invention.

FIG. 1 is a top plan view of a liquid crystal display device to which the invention is applied. In FIG. 1, the TFT substrate 100 and the opposite substrate 200 are adhered to each other by the sealing material 20, with the liquid crystal interposed between the TFT substrate 100 and the opposite substrate 200. The TFT substrate 100 is formed larger than the opposite substrate 200, and a portion of only one sheet of the TFT substrate 100 is a terminal portion 150. In the terminal portion 150, an IC driver 160 for driving a liquid crystal display panel and terminals for connecting a flexible wiring substrate for supplying power, video signals, and scanning signals to the liquid crystal display panel are formed.

In FIG. 1, in a display area 500, scanning lines 30 respectively extend in a horizontal direction and are aligned in a vertical direction. Further, video signal lines 40 respectively extend in the vertical direction and are aligned in the horizontal direction. An area surrounded by the scanning line 30 and the video signal line 40 is a pixel 35. In a narrow frame, a distance w between the end portion of the display area 500 and the end portion of the liquid crystal display device is small with about 1 mm. In this case, the width of the sealing material becomes smaller and if so, the outside water gets easily reach the liquid crystal layer in the display area. This easily causes a so-called black unevenness easily, affected by the water.

Figure 2:
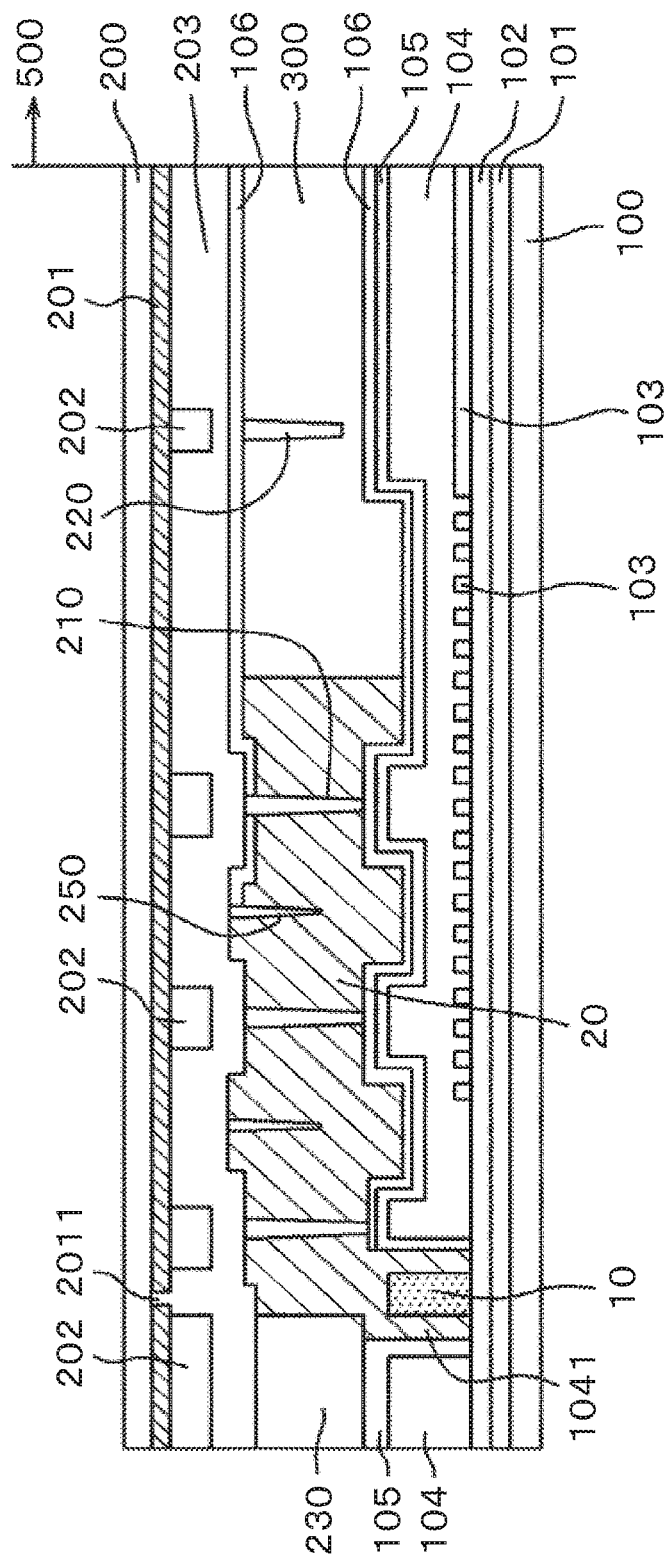
FIG. 2 is a cross-sectional view taken along the line A-A of FIG. 1.

FIG. 2 is a detailed cross-sectional view of a seal portion corresponding to the cross section taken along the line A-A of FIG. 1. In the seal portion illustrated in FIG. 2, the TFT substrate 100 and the opposite substrate 200 are adhered to each other by the sealing material 20. In FIG. 2, the liquid crystal 300 is charged inside the sealing material 20. In FIG. 2, a first insulating film 101 is formed on the TFT substrate 100 formed of glass. The first insulating film 101 can be occasionally an undercoat film formed to prevent the impurities generated from the glass from contaminating the TFT semiconductor layer. A second insulating film 102 is formed on the first insulating film 101. The second insulating film 102 can be occasionally agate insulating film in the TFT. A scanning-line lead line 103 is formed on the second insulating film 102. The scanning-line lead line 103 shown in a rectangular shape in FIG. 2 is a cross section of the scanning-line lead line 103, which is connected to the scanning line 30 in FIG. 1.

An organic passivation film 104 is formed to cover the scanning-line lead lines 103. The organic passivation film 104 is formed thick with 2 to 3 μm, also serving as a flattening film. The organic passivation film 104 is formed of photosensitive resin, which does not need photoresist for patterning.

In the display area, it is necessary to connect a pixel electrode or a common electrode formed on the organic passivation film 104 to a source electrode of the TFT, which connection is performed through the through-hole formed on the organic passivation film 104. The organic passivation film 104 is formed of resin such as acrylic resin. This film easily absorbs water and when the pixel electrode or the common electrode is formed directly on the organic passivation film 104, the pixel electrode or the common electrode is exfoliated especially in the through-hole portion, due to the water absorbed by the organic passivation film 104. In order to avoid this phenomenon, the conventional art has been designed in that the diameter of the through-hole is enlarged so that the inorganic insulating film 105 may cover the organic passivation film assuredly, also in the through-hole. In other words, in the conventional art, it has been essential that the organic passivation film 104 is covered with the inorganic insulating film 105.

In FIG. 2, an interlayer insulting film 105 made of SiN is formed on the organic passivation film 104. This interlayer insulting film 105 is an insulating film between a lower layer electrode formed flat and an upper layer electrode having a slit in the display area of the liquid crystal display device of the IPS method. In some cases, the lower electrode may be the common electrode and the upper layer electrode may be the pixel electrode and in other cases, it may be reversed; the lower layer electrode and the upper layer electrode are both formed of transparent oxide conductive film represented by Indium Tin Oxide (ITO).

Since the organic passivation film 104 easily transmits the water, as described in FIG. 9, the groove-shaped through-hole 1041 is formed in the organic passivation film 104 in order to shut out the water coming from the end portion through the organic passivation film 104. The groove-shaped through-hole 1041 is formed around the whole periphery of the TFT substrate 100 to surround the display area within the seal portion.

The characteristic of the invention is that a water absorption layer 10 formed by the organic passivation film is formed in a shape of wall within the groove-shaped through-hole 1041, not covered with the inorganic insulating material. This water absorption layer 10 is to absorb the water when water transmitted from the end portion of the TFT substrate 100 through the organic passivation film 104 further intends to pass the groove 1041 of the organic passivation film 104. According to this, a time from the intrusion of the water into the liquid crystal display panel to the arrival at the liquid crystal layer 300 can be prolonged. As the result, a lifetime of the liquid crystal display device can be prolonged.

In FIG. 2, an alignment film 106 is formed on the interlayer insulting film 105. The alignment film 106 is formed by applying an alignment film material that is originally liquid according to the flexography or inkjet, and three concave portions are formed on the organic passivation film 104 as a stopper so that the alignment film material does not arrive at the outer end portion of the seal portion. Further, the groove-shaped through-hole 1041 formed further outside of the concave portions also serves as the stopper against the alignment film material. In FIG. 2, the alignment film material passes over the three concave portions and stops in the final convex portion.

In FIG. 2, a black matrix 201 is formed on the side of the opposite substrate 200. The black matrix 201 in FIG. 2 is provided in order to avoid light from leaking from the seal portion. The black matrix 201 is formed of resin and a black matrix groove 2011 is formed in order to shut down the water transmitted through the resin. A color filter 202 is formed on the black matrix 201 in a stripe shape in a direction vertical to the paper surface. The color filter 202 is formed correspondingly to a first column spacer 210 formed on an overcoat film 203.

The overcoat film 203 is formed on the color filter 202. The overcoat film 203 is provided with a convex portion in correspondence with the portion of the color filter 202. This convex portion is to avoid the alignment film material from spreading outside of the substrate when applying the alignment film material. The first spacer 210 is formed in the convex portion of the overcoat film 203. The column spacer 210 is to define the space between the opposite substrate 200 and the TFT substrate 100 in the seal portion.

In FIG. 2, a second column spacer 220 lower than the first column spacer 210 is formed nearer to the side of the display area than the first column spacer 210. When a pressure is applied to the opposite substrate 200 from the outside, the second column spacer 220 is to avoid the space between the TFT substrate 100 and the opposite substrate 200 from narrowing excessively.

A wall spacer 250 is formed outside of the first column spacer. This wall spacer becomes the stopper against the alignment film. The wall spacer 250 is formed in two stages. The alignment film 106 is formed to cover the overcoat film 203. The outer shape of this alignment film is partitioned by the wall spacer 250.

A bank-shaped spacer 230 is formed in the end portion of the seal portion. Production of the individual liquid crystal display panels is inefficient; therefore, a plurality of liquid crystal display panels are formed on a mother substrate to produce the liquid crystal display panels at once. In the mother substrate with the plural liquid crystal display panels formed there, the bank-shaped spacer 230 is arranged in the boundary of the liquid crystal display panels, scribing is performed along the center of the bank-shaped spacer 230, and then, the substrate is cut into individual pieces of liquid crystal display panels. When there is no bank-shaped spacer 230, this portion is the sealing material 20 and when the sealing material 20 exists, even if scribing is performed, it cannot be cut.

Figure 3:
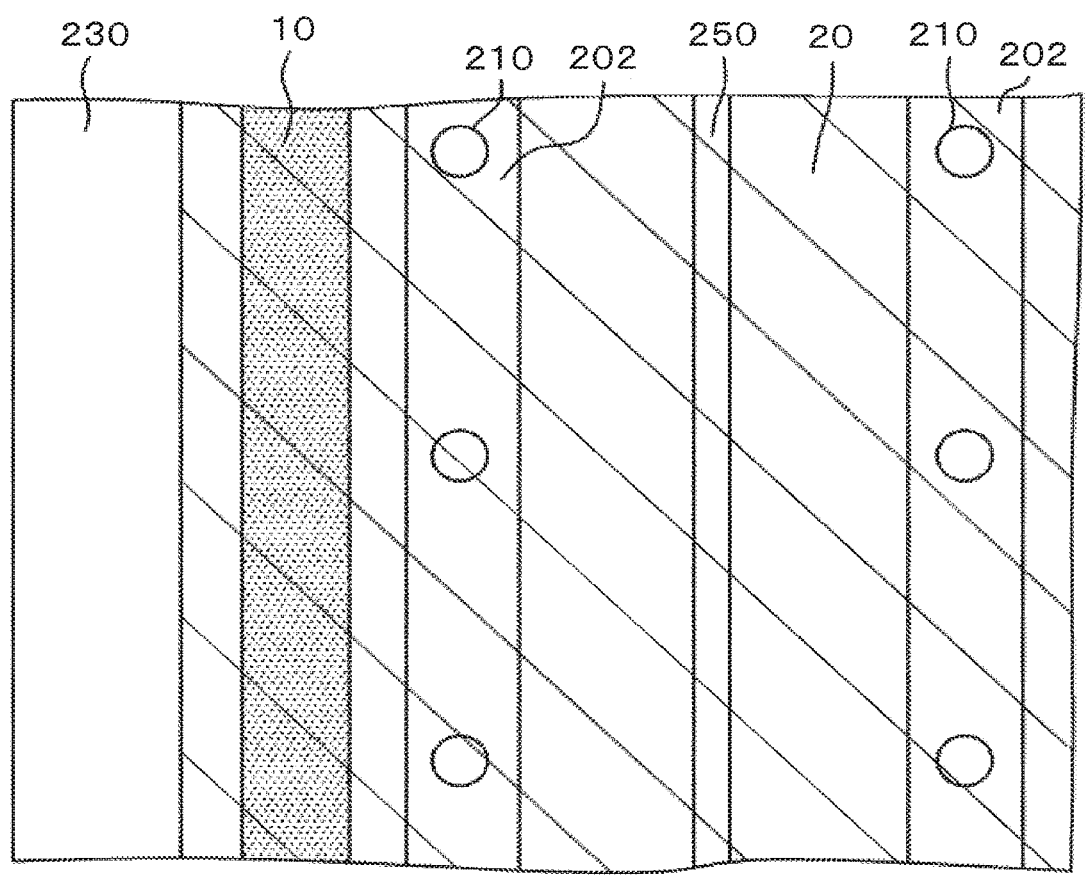
FIG. 3 is an enlarged top plan view corresponding to FIG. 2.

FIG. 3 is a top plan view corresponding to the portion of FIG. 2. In FIG. 3, the sealing material 20 is formed inside the bank-shaped spacer 230. In FIG. 3, the color filter 202 is formed in a stripe shape and the first column spacer 210 is arranged in the portion corresponding to the color filter 202. In FIG. 3, the color filter 202 and the first column spacer 210 are shown, by way of example, for two lines. The wall spacer 250 is arranged between the first column spacer 210 and the first column spacer 210. The sealing material 20 is formed extensively in the end portion of the bank-shaped spacer 230. In FIG. 3, the water absorption layer 10 is formed between the bank-shaped spacer 230 and the color filter 202 on the side of the TFT substrate.

Figure 4:
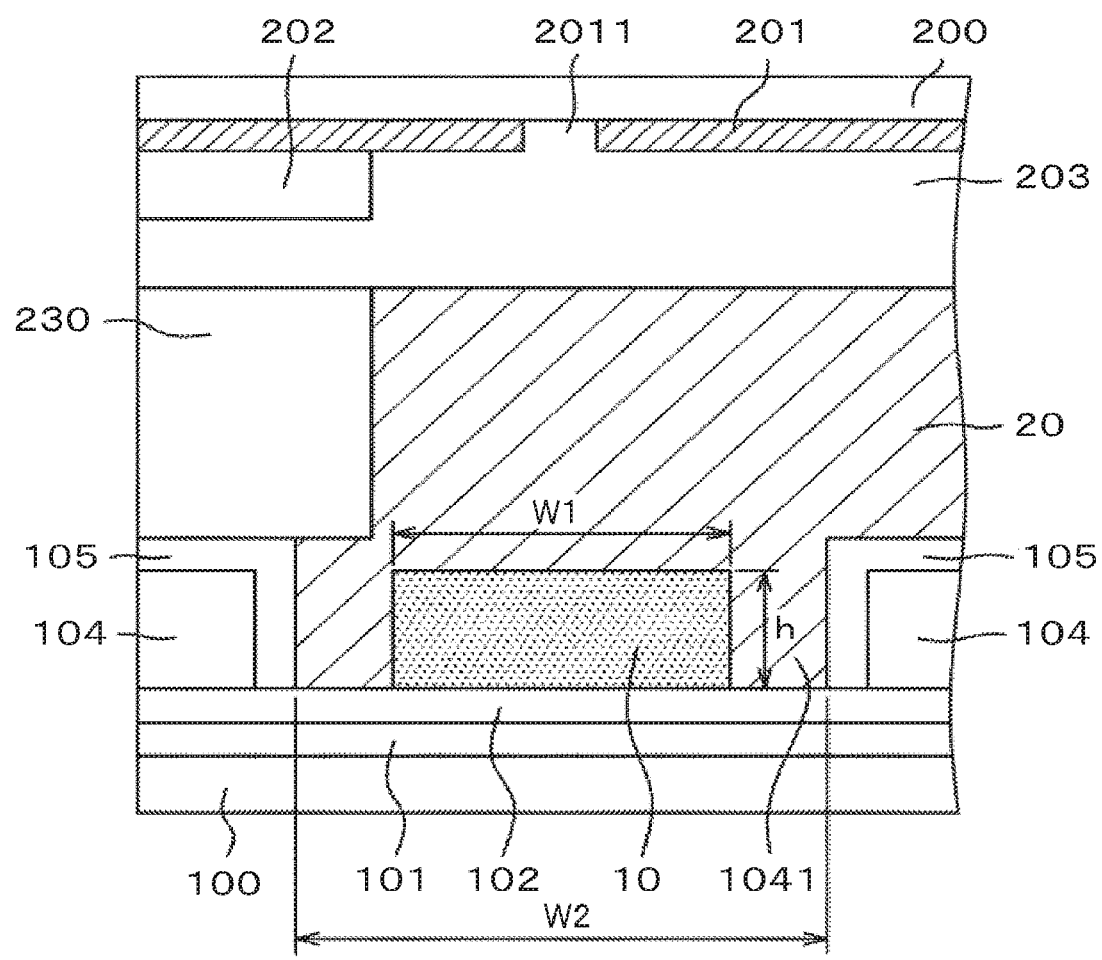
FIG. 4 is an enlarged cross-sectional view of a seal portion of FIG. 2.

FIG. 4 is a cross-sectional view enlarging the portion of the water absorption layer 10 in FIG. 2. In FIG. 4, the water absorption layer 10 is formed in the portion of the groove-shaped through-hole 1041 of the organic passivation film 104. This water absorption layer 10 is formed of the same material in the same process as that of the organic passivation film 104; as the result, there needs no additional material cost and process in order to form the water absorption layer.

Figure 5:
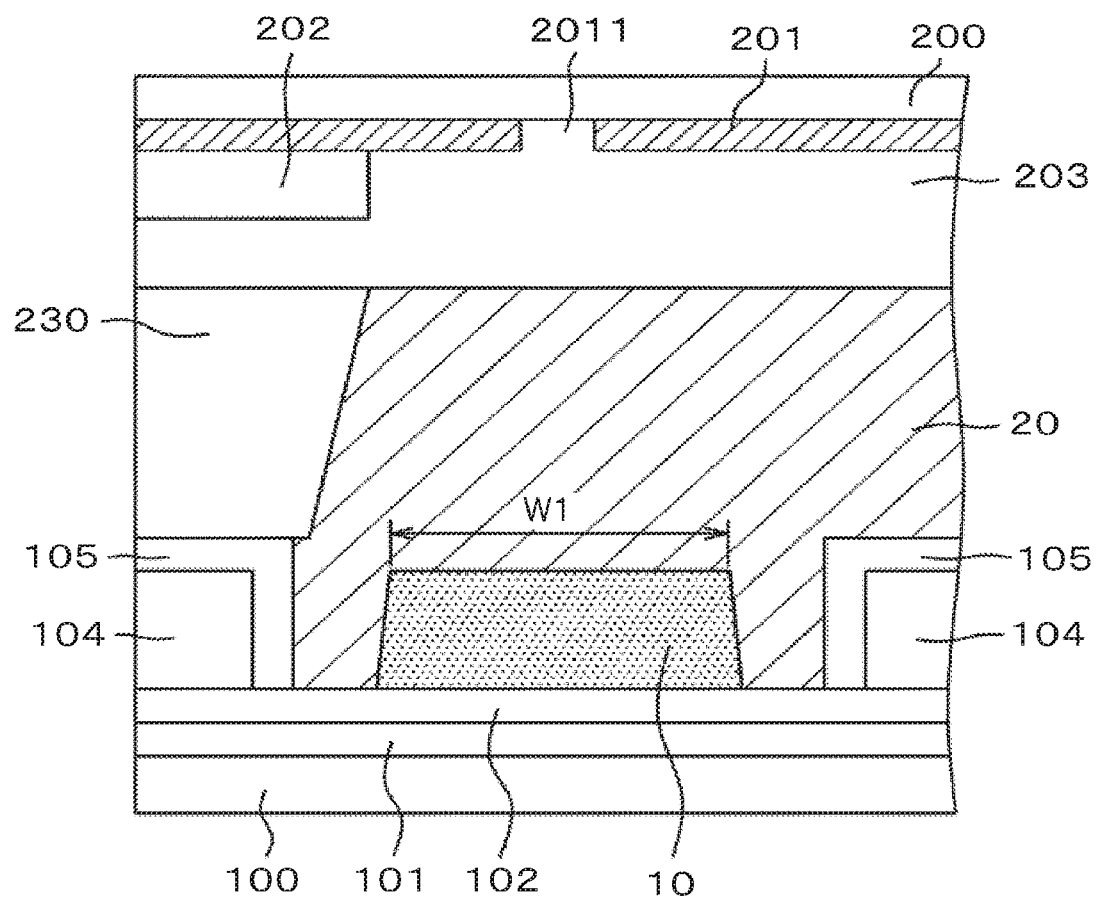
FIG. 5 is an enlarged cross-sectional view of another example of the seal portion of FIG. 2.

The water absorption layer 10 is not covered with the inorganic insulating film 105, differently from the organic passivation film 104 in the other portion. Therefore, after completion of the liquid crystal display device, it can absorb the water transmitted through the sealing material 20. In FIG. 4, the width w1 of the water absorption layer 10 is, for example, 30 µm and the height h is 2 to 3 µm. On the other hand, the width of the groove-shaped through-hole 1041 formed in the organic passivation film 104 is about 70 µm. Here, these numeric values can be adjusted according to the water absorption effect expected by the water absorption layer. FIG. 5 is a cross-sectional view when the cross section of the water absorption layer 10 is trapezoid; when the water absorption layer 10 is in this shape, the width w of the water absorption layer 10 can be measured only by the bottom of the trapezoid. Here, in the embodiment, the water absorption layer is not covered with the inorganic insulating film, but a part thereof may be covered with the inorganic insulating film to expose the part from the inorganic insulating film. Further, according to the water entering amount, in a plan view, the area of the portion exposed from the inorganic insulating film may be partially various.

Figure 6:
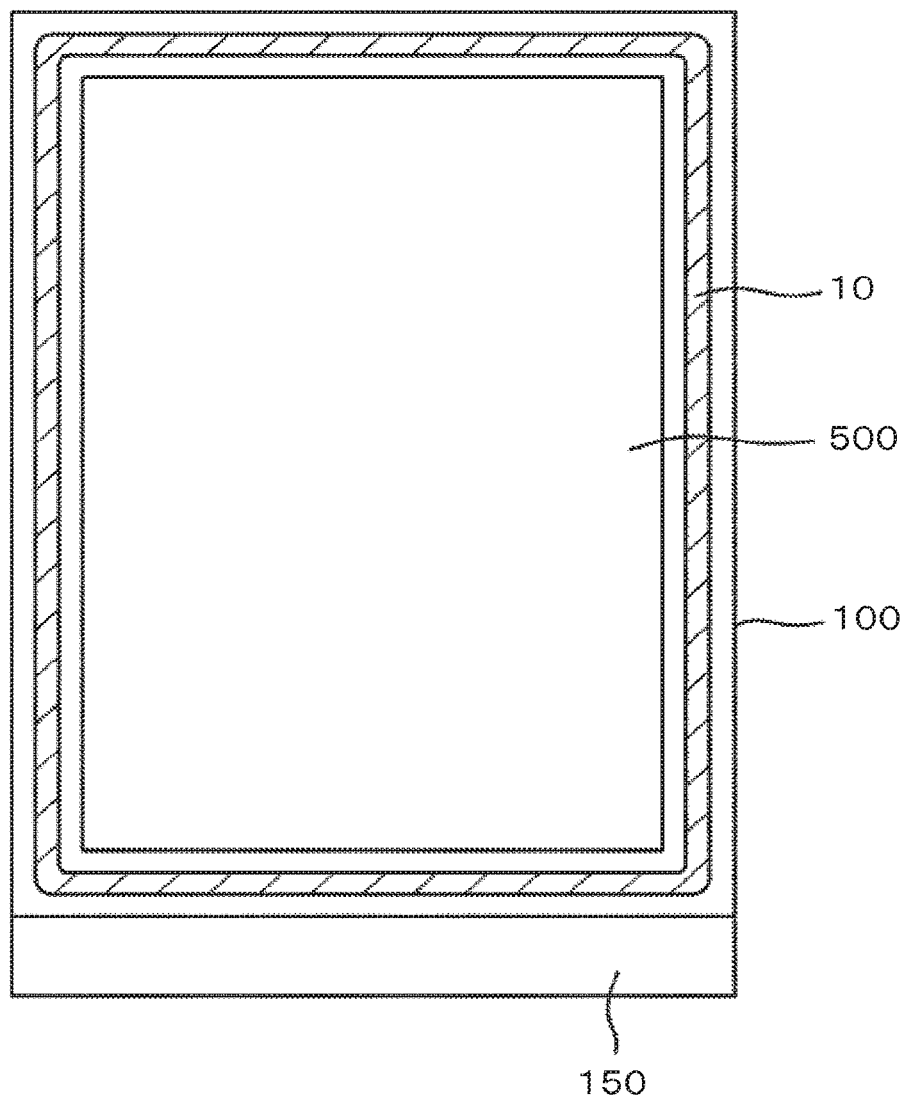
FIG. 6 is a schematic plan view illustrating the invention.
Figure 7:
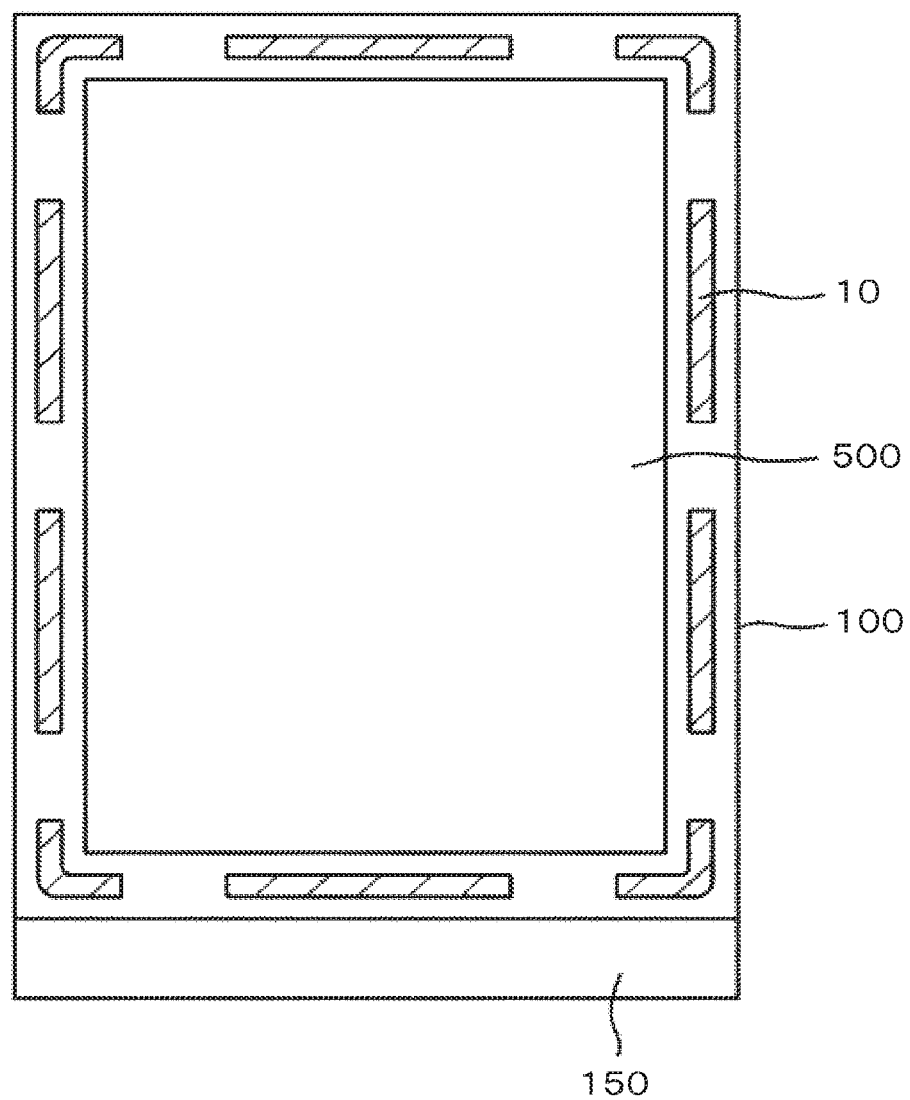
FIG. 7 is a schematic plan view illustrating another example of the invention.
Figure 8:
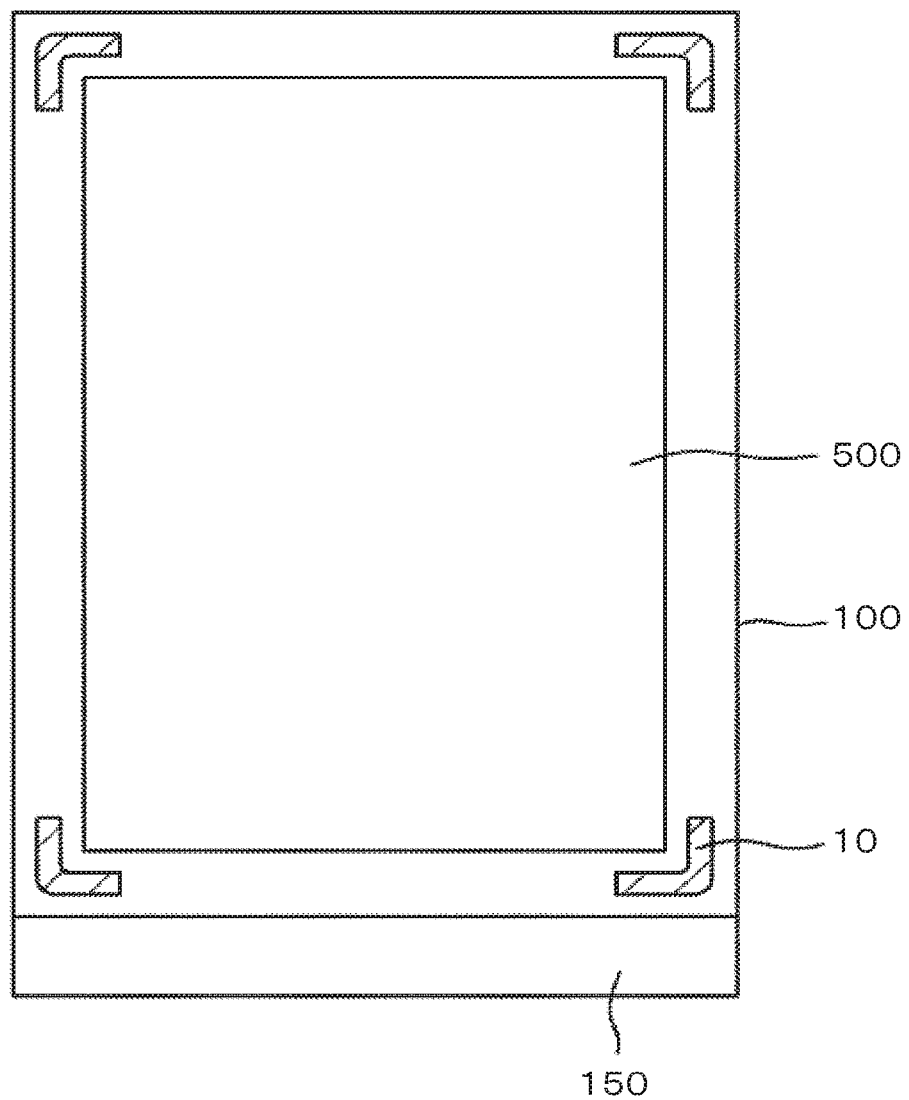
FIG. 8 is a schematic plan view illustrating further another example of the invention.

FIG. 6 is a top plan view only showing the shape of the water absorption layer 10 in the TFT substrate. As illustrated in FIG. 6, the water absorption layer 10 is generally formed in the whole periphery to surround the display area 500. However, when the water absorption layer 10 cannot be formed continuously in the periphery with regard to the layer of the wiring, the above layer 10 may be formed discontinuously, as illustrated in FIG. 7. Especially, in the screen corners, when black unevenness occurs on the screen, the water absorption layer 10 may be formed only around the corners, as illustrated in FIG. 8. Further, in FIGS. 6 to 8, the water absorption layer 10 is formed in a linear shape in a plan view; however, it is not restricted to this but may be formed in a wave shape or a zigzag.

As mentioned above, according to the invention, the water absorption layer 10 can be formed in the same material in the same process as that of the organic passivation film 104; therefore, the black unevenness generated on the screen due to the water can be avoided without an increase in the manufacturing cost.

What is claimed is:

1. A display device comprising:
a first substrate having a first inorganic insulation film, an organic insulation film provided on the first inorganic insulation film, and a second inorganic insulation film provided on the organic insulation film,
a second substrate, opposed to the first substrate, and
a sealing member provided between the first substrate and the second substrate, wherein
in a sectional view, the organic insulation film has a portion which is between a first groove and a second groove in a region that overlaps with the sealing member, and
the second inorganic insulation film is not formed on the portion, in the sectional view.

2. The display device according to claim 1, further comprising the second substrate having a protrusion, wherein
the protrusion overlaps the sealing member, in the sectional view.

3. The display device according to claim 1, further comprising a conductive film provided between the first inorganic insulation film and the organic insulation film,
wherein the portion does not overlap with the conductive film, in the sectional view.

4. The display device according to claim 1, further comprising an alignment film provided on the second inorganic insulation film,
wherein the alignment film overlaps the sealing member, in the sectional view.

5. The display device according to claim 4, wherein the alignment film does not cover the portion.

6. The display device according to claim 1, wherein the second groove is located closer to an end of the first substrate than the first groove, in the sectional view.

7. The display device according to claim 1, wherein the first groove is filled with the sealing member.

8. The display device according to claim 7, wherein the second groove is filled with the sealing member.

9. The display device according to claim 2, wherein the protrusion is in an end of the second substrate.

10. The display device according to claim 2, wherein the protrusion does not overlap the portion, in the sectional view.

11. The display device according to claim 1, wherein the second inorganic insulation film is not formed on entirety of the portion, in the sectional view.

* * * * *